I. G. LIGHT.
EGG TURNER FOR INCUBATORS.
APPLICATION FILED JUNE 4, 1917.
1,264,664.
Patented Apr. 30, 1918.
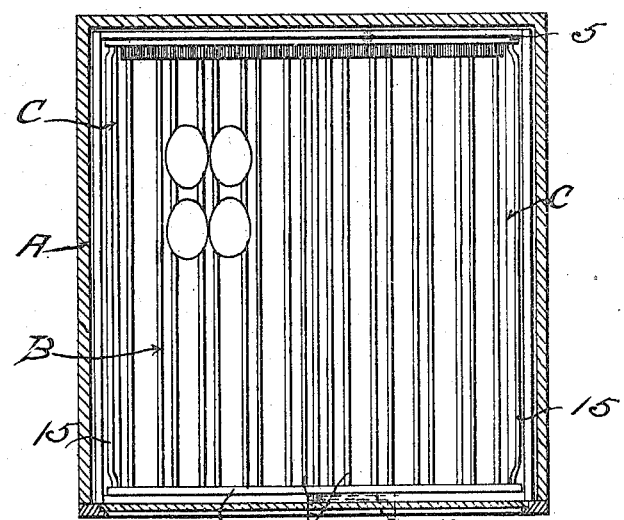
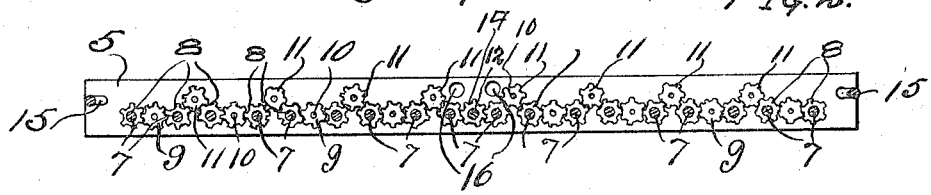
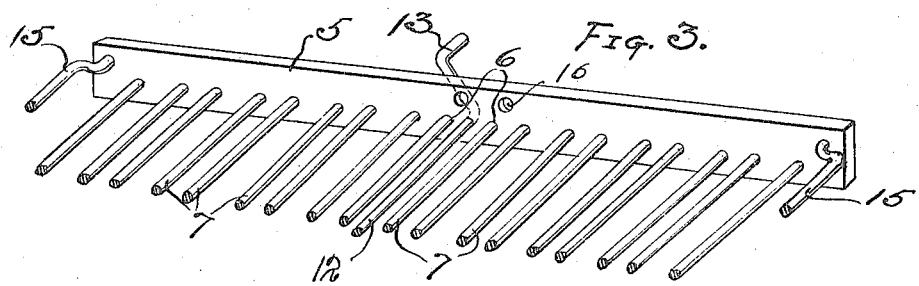
Witnesses
E. G. Schrider
C. C. Chandler
Inventor
I. G. Light
Attorneys

UNITED STATES PATENT OFFICE.

IRVING G. LIGHT, OF GERMAN VALLEY, ILLINOIS.

EGG-TURNER FOR INCUBATORS.

1,264,664.   Specification of Letters Patent.   Patented Apr. 30, 1918.

Application filed June 4, 1917. Serial No. 172,789.

*To all whom it may concern:*

Be it known that I, IRVING G. LIGHT, a citizen of the United States, residing at German Valley, in the county of Stephenson, State of Illinois, have invented certain new and useful Improvements in Egg-Turners for Incubators; and I do hereby declare the following to be a full, clear, and exact description of the invention, such as will enable others skilled in the art to which it appertains to make and use the same.

This invention relates to improvements in egg turning devices for incubators.

An object of the present invention is to provide an egg turner which is designed to be removably positioned in an incubator egg tray of ordinary construction and embodies means of novel arrangement upon which the eggs are supported during the period of incubation and by which the eggs may be quickly turned simultaneously without removing the tray from the machine.

With the above and other objects of similar nature in view, the invention consists in the construction, combination and arrangement of parts, set forth in and falling within the scope of the appended claim.

In the drawing:—

Figure 1 is a horizontal section through an incubator of conventional type with the invention positioned therein.

Fig. 2 is a transverse section through the turner, and

Fig. 3 is a fragmental perspective view of one end of the turner.

Referring now more particularly to the accompanying drawing there is shown a horizontal section through an incubator casing A in which a tray B of ordinary construction is removably positioned and slidably supported upon the usual guides C. The turning device is of all metal construction, and comprises a pair of spaced rectangular plates 5 forming the end members of the turner and similarly provided with a longitudinal series of bearing openings 6. Extending between the plates or end members 5 and rotatably journaled in the openings 6 are a plurality of spaced parallel rods 7 the same constituting the bottom of the turner upon which the eggs for incubation are placed and supported as shown in Fig. 1 of the drawing. It will be noted that the spaces between the rods 7 are alternately wide and narrow the eggs being supported upon those rods which are relatively far apart and being thus arranged in parallel rows.

Fixed upon each of the rods 7 adjacent one of the end members 5 is a gear 8, while arranged between those of the rods which are relatively far apart and meshing with the gears 8 are other gears 9 the same being journaled upon stub shafts 10 carried by said end member. Additional gears 11 are mounted upon said end member above the relatively narrow spaces between the rods 7 and are also in mesh with the gears 8.

For operating the rods 7 there is extended centrally between and journaled in the end members 5 a shaft 12 one end of which is continued beyond the adjacent end member and terminates in a crank 13, while fixed to its other end and meshing with the gears 8 of the center pair of rods is a gear 14. Thus by rotating the shaft 12 through the medium of the crank the rods 7 will also be rotated, motion being transmitted through the several gears as will be evident. At each side of the turner and connecting the end members are guard members 15 which are disposed above the plane of the rods 7 and serve to prevent rolling of the eggs from the turner. It will be understood when the turner is filled with eggs and placed in the tray B, and with the latter is introduced into the incubator, that the eggs may be quickly and conveniently turned without removing the tray, by simply rotating the shaft 12, a turning motion being imparted to the eggs by the rods 7. About the 19th day of incubation, the turner is removed from the tray and the eggs placed upon the latter to hatch in the usual manner. To facilitate removal of the turner from the tray, openings 16 are provided in the end members 5 for the insertion of the fingers of the operator.

What I claim is:—

An egg turner, comprising a pair of spaced parallel bars, a plurality of spaced parallel rotatable rods journaled in the bars in the same plane with each other, a gear on one end of each rod, gears mounted on one of the bars and meshing with the other gears, certain of said rods being arranged in closer relation to each other than the other rods, laterally disposed U-shaped guards mounted in the ends of the bars above the plane of the rods, and a crank formed on one of the rods.

In testimony whereof, I affix my signature in the presence of two witnesses.

IRVING G. LIGHT.

Witnesses:
E. Ross MELVIN,
T. C. GRIM.

Copies of this patent may be obtained for five cents each, by addressing the "Commissioner of Patents, Washington, D. C."